UNITED STATES PATENT OFFICE.

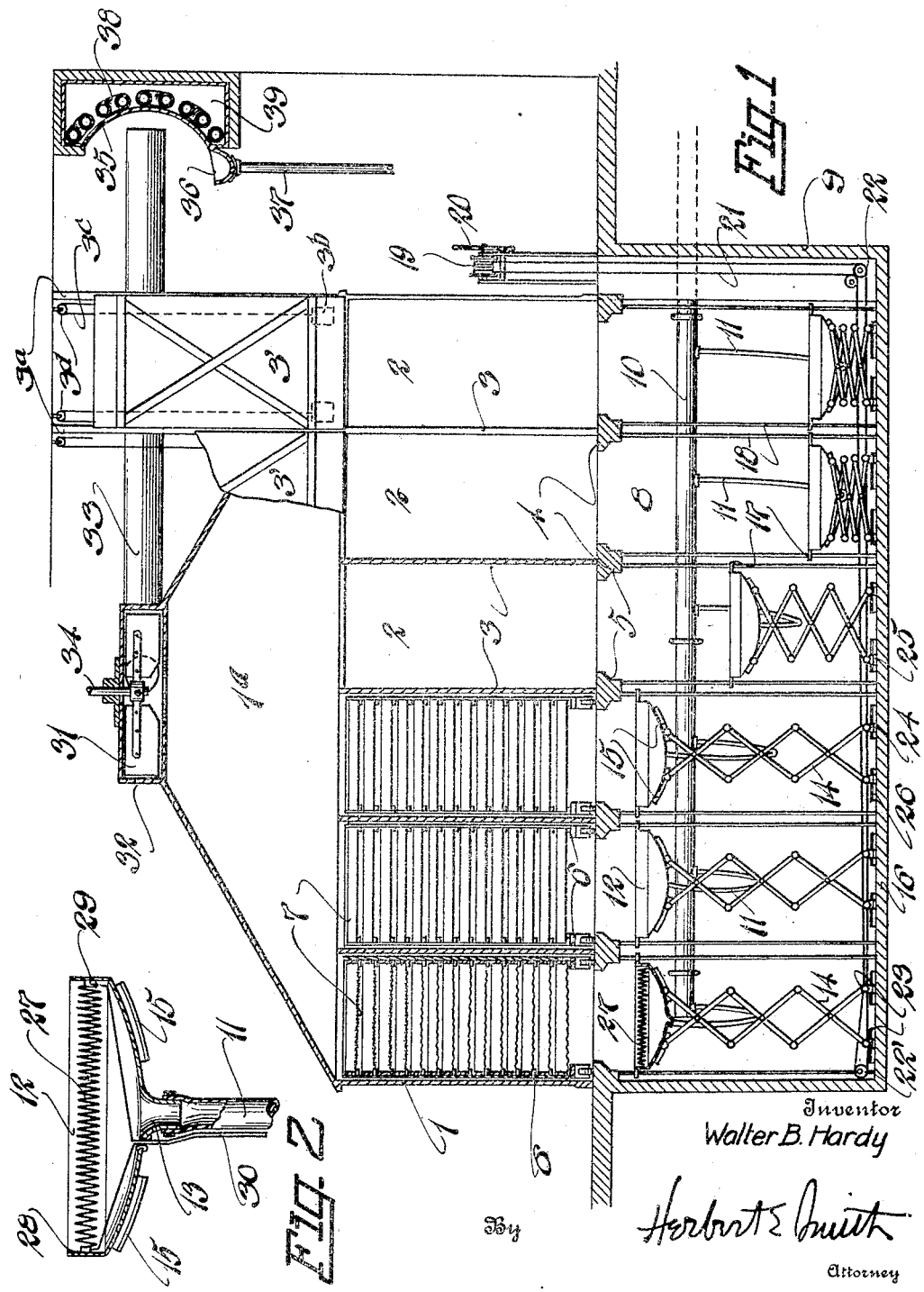

WALTER B. HARDY, OF FRESNO, CALIFORNIA.

DRIER.

1,367,658.  Specification of Letters Patent.  Patented Feb. 8, 1921.

Application filed March 20, 1920. Serial No. 367,532.

*To all whom it may concern:*

Be it known that I, WALTER B. HARDY, a citizen of the United States, residing at Fresno, in the county of Fresno and State of California, have invented certain new and useful Improvements in Driers, of which the following is a specification.

My present invention relates to improvements in driers or dehydrating apparatus especially applicable for use in drying fruits and similar products, and while the following description and specification will be referred to as for this specific purpose of drying fruits, it will of course be understood that the invention is not limited to this specific object, but is capable of use in various other forms and for a variety of purposes.

The primary object of the invention is the provision of a drying house and equipment whereby a single fruit or a variety of fruits may be dried or dehydrated simultaneously by the utilization of heating or drying apparatus which is adjustable with relation to the fruit to be dried in order that an intense heat may be applied in some instances, a moderate drying heat utilized, or if desired a comparatively low temperature of heat may be utilized in the currents of air used for the purpose of drying the fruits. In this manner the heat applied to the fruit may be governed and regulated in accordance with the conditions necessary for a proper drying of the fruit, and as different kinds of fruit require different temperatures of heat for their dehydration, it will readily be apparent that the drying apparatus or equipment of the invention may be used in connection with varieties of fruits without the necessity for alterations or changes except to readjustment of parts, as will be hereinafter described.

With the above, and other objects in view the invention consists in certain novel combinations and arrangements of parts involving the drying house and adjustable equipment for heating the fruit to be dried, whereby the house is divided into compartments or inclosures for portable racks or frames containing the fruit in trays, and the heating equipment, made up of a multiplicity of single units receiving heating air currents from a common source, and independently adjustable with relation to a complementary compartment and its contained rack of fruit trays, is adapted for co-action with the several compartments as will be described. The invention further consists in certain novel arrangements of parts for attaining the best results in the drying apparatus, as will be more specifically pointed out and claimed.

In the accompanying drawings which form part of this specification I have illustrated one complete example of the physical embodiment of my invention constructed and arranged according to the best mode I have so far devised for the practical application of the principles of my invention, and while the drawings disclose a complete reduction to practice of the invention, it will be understood that colorable changes and alterations may be made in the illustrated structure without departing from the spirit of my invention as embodied in the appended claims.

Figure 1 is a sectional view of a drying house embodying my invention, and equipped with the drying apparatus forming novel features thereof.

Fig. 2 is an enlarged, detail sectional view of one of the heating appliances having electrical means for heating the air currents to be transmitted to the fruit to be dried.

In the preferred form of my invention as illustrated in the drawings I utilize a drying house 1 of suitable size and structural formation including the necessary doors and openings for the operation of the appliance or apparatus, and the lower or main portion of the house is fashioned into a number of drying compartments 2, by the erection of the vertically arranged and spaced partitions 3 extending parallel across the main portion of the house, open at the top and bottom, and closed at their open fronts by means of vertically slidable doors or closures 3', one for each compartment. These alined doors may form a portion of the outer wall of the house, and are arranged in succession and alinement along the outer or front portion of the house and guided in their vertical movement by the frames 3ᵃ for the purpose. Preferably the doors are equalized by the use of counterweights 3ᵇ suspended from the chains or cables 3ᶜ passing over the guide pulleys 3ᵈ suitably supported above the main portion of the house, and they may be lifted or raised to give access to the interior of the house or to the complementary compartments, or with equal facility be closed during the operation of fruit drying.

The partitions are alined with and supported above the trackways or surfaces 4 formed on the upper face of the girders or floor beams 5, extending parallel across the floor portion of the house, and the trackways are designed to support the portable or wheeled racks 6 upon which are supported the shelves or trays 7 for the reception of the fruit to be dried.

The house is provided with a sub compartment or pit 8 inclosed within the walls 9, and the pit is in open communication with the space within the house and the compartments for the passage of heated air currents to the fruit on the trays and racks within the compartments.

Extending longitudinally of the pit and elevated a sufficient height above the floor level thereof, is a main air pipe 10 which is supplied from a suitable source with fresh air to furnish air to the several branch pipes 11, in the form of flexible tubes or hose, attached to and communicating with the main pipe and adapted to draw air currents therefrom.

Below each of the individual compartments 2 and adapted to supply heat to the trays contained therein, are arranged a series of air heating devices each comprising an adjustable head 12 in the form of a shallow bowl made up of suitable material, and provided with a lower, central nozzle 13 for the attachment of the free end of the branch air tube 11 extending from the main air pipe adjacent to the bowl. The bowls are horizontally disposed, and are vertically reciprocable or adjustable through the medium of extensible brackets, illustrated as lazy tongs 14, whose uppermost pivoted arms are pivoted to the bowl at 15, while the lowermost arms are supported from the floor 16 of the pit as will be described.

The bowls are independently movable and capable of vertical adjustment, being guided in their movement by means of the perforated ears 17 diametrically arranged at the edge of the bowl which are adapted to slide or glide along the pair of posts or guide rods 18, 18, a pair being provided for each bowl and extending from the floor 16 of the pit to the girder directly thereabove.

The bowls may be elevated, or lowered, independently and individually by means accessible from the outside of the drying house, and as an exemplification of such means I have shown a windlass 19 or winding drum equipped with the usual hand wheel 20, and with an endless rope or cable 21 passed around the drum and extending down into the pit around guide pulleys 22 and 22′. At 23 one reach of the rope or cable is attached to one of the lowermost pivoted arms of the extensible bracket or lazy tongs 14, and each of these lower arms has at its free end a slide shoe 24 or 25 that are slidable in the slideways or brackets 26 secured on the floor 16 of the pit. Now it will be apparent that as the hand wheel is turned, to the right for instance, the two slide shoes of an extensible bracket will be drawn together or toward each other, and guided in their slide ways, with the result that the bracket or lazy tongs is extended vertically to lift or elevate the bowl, while if the hand wheel is turned in the opposite direction the pivoted shoes on the bracket are separated and the bracket retracted. Three positions of the extensible bracket are illustrated in Fig. 1 of the drawing, i. e., at the extreme extension, extreme retracted position and a third position is illustrated with the bowl at an intermediate height, all with relation to the portable rack and its fruit trays in the apartment or compartment above the bowl. By proper manipulation of the hand wheel and windlass, it will be apparent that the bowl of a selected device may be moved nearer to or farther away from a rack under which it is directly located, and by this means the pressure of the current of air furnished to the compartment above the bowl, may be varied, thus varying the intensity or temperature of the heated air when it reaches the fruit and passes upwardly through the drying house.

Currents of air at a low pressure are supplied to the main air pipe, or natural draft may be utilized to supply the fresh quota of air to each compartment through the several branch pipes and bowls, and as the air passes through the bowl on its way to the compartment I provide means for heating the air currents immediately before they pass to the compartment.

A convenient and facile mode for heating the air currents passing through each bowl is furnished by an electric heating coil or resistance wire 27 extending transversely across the open mouth of the bowl and suspended in suitable insulated supports at 28 and 29 diametrically located at the edge of the bowl. The electric conductors or wires 30 for the heating coils pass through an opening in the bottom of the bowl and may follow the flexible air tube and main air pipe to their source of energy, thus adapting the heating appliance to the adjustment of the bowl as before described.

The currents of air after being heated rise through the compartments and pass around and over the shelves and trays or fruit receptacles on the racks, and in the process of dehydrating, the moisture laden air currents pass up through the open upper ends of the compartments to the dome 1ᵃ of the drying house. Preferably a suction fan 31 is located at the top of the house and at the interior thereof for drawing the moist air currents through its housing 31 and impelling them through the outlet pipe 33. A drying shaft 34 is indicated as operatively connected with the fan and receives power from a suitable source (not shown) by means of which the moist air currents are drawn from the dome of the structure 1 and impelled through the pipe 33 against a baffle wall or plate 35. This wall or plate is concavo-convex in cross section and located within the interior of the house, or in a compartment communicating therewith, and forms a condensation surface for the moisture in the air currents to adhere to, from which the water of condensation runs down into a trough 36 extending along the bottom of the wall, and thence the water may be disposed of through the down pipe 37 leading from the trough. Back of the condensation plate or wall are condenser coils or pipes 38 inclosed within the tank 39, and cold water may be passed through the coils, or ice be placed in the tank to cool the condensation wall. After the moisture is eliminated from the air, the latter is permitted to return to the interior of the drying house to mingle with the currents of air arising from the heating equipment in the pit, and it will be understood that a continuous circulation of air is maintained within the interior of the house.

In the process of drying fruit according to my above described apparatus, the trays are laden with fruit in usual manner, placed on the portable racks, and the latter run into their respective compartments, after which the doors are closed and the house sealed for the retention of the heated air currents.

It is essential that the evaporation of the moisture from the fruit be started slowly and increased gradually, to prevent cooking or overheating the outer portions of the fruit which are of course first affected by the heated air currents. Thus at the initiation of the drying process, the bowls, in the form of heat reflectors or radiators, are positioned at the proper distance below the fruit rack to furnish the heated air currents, the air being heated as it passes the coil in the bowl. As the evaporation progresses, the radiators may be moved nearer to the fruit in the racks by utilization of the hand wheels for the purpose of extending the brackets which support the heat radiating bowls as before described, to furnish a more directly applied and intense heat for drying the fruit.

Inasmuch as the individual heating units are independently regulated and adjusted it will be apparent that they may be adapted to different kinds of fruits in the same drying house, or to different conditions of similar fruits, and by this mode of treatment the time for drying the fruit is cut down and saved to a great extent, and the heat is applied in a scientific manner to get the best results in drying fruit.

What I claim is—

1. In a drying apparatus, the combination with means for supporting fruit, a heat radiator for furnishing heated air currents to said fruit, and means for adjusting the radiator with relation to the supported fruit.

2. In a drying apparatus, the combination with an inclosed fruit supporting rack and a pit therebeneath, heat radiating device and means for passing air currents therethrough in the pit, and means for adjusting said heat radiator.

3. In a drying apparatus the combination with a house formed in compartments and a lower pit in open communication with said compartments, of a series of adjustable heat radiators below the compartments and means for passing air currents through said radiators, means above the compartments for drawing off moistened air, and means for condensing the moisture in the air and returning the dehydrated air to the house.

4. In a drying apparatus, the combination with fruit supporting means, of an extensible and retractable bracket, a heat radiator supported on the bracket in operative relation with the fruit supporting means, and means for supplying air currents to said heat radiator.

5. In a drying apparatus as described, the combination with fruit supporting means, of an extensible and retractable bracket, a heat radiator supported on the bracket in operative relation to the fruit supporting means, an air supply pipe, and a flexible branch air pipe connecting said supply pipe and the radiator, for the purpose described.

6. In an apparatus as described, the combination with a heat radiator and heating device, of an extensible supporting bracket for the radiator, and means for operating said extensible bracket for the purpose described.

7. In an apparatus as described, the combination with a heat radiator and heating device, and means for supplying air currents thereto, of an extensible supporting bracket for the radiator, and means for operating said extensible bracket for the purpose described.

In testimony whereof I affix my signature.

WALTER B. HARDY.